(12) United States Patent
Barauke et al.

(10) Patent No.: US 8,286,913 B2
(45) Date of Patent: Oct. 16, 2012

(54) FIXING RAIL FOR ATTACHING LOADING DEVICES TO THE LOADING DECK OF AN AIRCRAFT

(75) Inventors: Christoph Barauke, Hausham (DE); Andreas Patzlsperger, Waakirchen (DE); Thomas Huber, Schliersee (DE)

(73) Assignee: Telair International GmbH (DE)

( * ) Notice: Subject to any disclaimer, the term of this patent is extended or adjusted under 35 U.S.C. 154(b) by 975 days.

(21) Appl. No.: 11/961,819

(22) Filed: Dec. 20, 2007

(65) Prior Publication Data
US 2010/0264267 A1 Oct. 21, 2010

(30) Foreign Application Priority Data
Dec. 21, 2006 (DE) .......................... 10 2006 060 785

(51) Int. Cl.
B64C 1/22 (2006.01)
(52) U.S. Cl. ............... 244/118.1; 244/118.6; 244/117 R
(58) Field of Classification Search .............. 244/118.1, 244/118.2, 118.5
See application file for complete search history.

(56) References Cited

U.S. PATENT DOCUMENTS

| | | | |
|---|---|---|---|
| 3,251,489 A | 5/1966 | Davidson | |
| 3,641,940 A | 2/1972 | Evans | |
| 3,906,870 A | 9/1975 | Alberti | |
| 4,401,286 A * | 8/1983 | Naffa | 244/137.3 |
| 4,875,645 A * | 10/1989 | Courter | 244/137.1 |
| 4,930,612 A | 6/1990 | Thorndyke | |
| 7,604,204 B2 * | 10/2009 | Jacobsen et al. | 244/137.1 |
| 7,913,950 B2 * | 3/2011 | Huber | 244/118.1 |
| 2005/0211835 A1* | 9/2005 | Henley et al. | 244/118.6 |
| 2005/0224644 A1* | 10/2005 | Huber et al. | 244/118.1 |

FOREIGN PATENT DOCUMENTS

| | | |
|---|---|---|
| DE | 29 08 400 A1 | 9/1980 |
| DE | 19900839 A1 | 7/2000 |
| DE | 199 23 347 A1 | 11/2000 |
| EP | 0 122 573 A | 10/1984 |
| EP | 0 881 144 A | 12/1998 |
| EP | 1 637 449 A | 3/2006 |
| WO | WO 2006/049778 A1 | 5/2006 |

* cited by examiner

*Primary Examiner* — Christopher P Ellis
*Assistant Examiner* — Medhat Badawi
(74) *Attorney, Agent, or Firm* — Barnes & Thornburg LLP

(57) ABSTRACT

The invention relates to a fixing rail for attaching loading devices, particularly rollers, locking bars or power drive units to the loading deck of an aircraft. This fixing rail comprises a first and a second rail, each rail having a cheek with first attachment devices, to which the loading devices can be fixed, and first floor sections, to which the cheek is attached by a lower edge, each first floor section having second attachment devices, by means of which the floor section can be attached to the loading deck. In this arrangement, the cheeks separated from each other are mountable on the loading devices, so that they are connected to each other by means of the loading devices and the loading deck, following mounting and attaching to the loading deck. In this way, a considerable weight saving is achieved along with increased variability of use of the fixing rail.

19 Claims, 8 Drawing Sheets ature-fixing-rail-attaching-loading-devices-loading-deck-aircraft

FIXING RAIL FOR ATTACHING LOADING DEVICES TO THE LOADING DECK OF AN AIRCRAFT

CROSS-REFERENCE TO RELATED APPLICATIONS

This application claims priority of German patent application no. 10 2006 060 785.6, filed Dec. 21, 2006, the disclosure of which is incorporated herein by reference in its entirety.

FIELD OF THE INVENTION

The invention relates to a fixing rail for attaching loading devices, particularly rollers, locking bars, power drive units or similar loading devices to a loading deck of an aircraft.

BACKGROUND OF THE INVENTION

In the loading bay of an aircraft, particularly a high capacity aircraft, containers or pallets are normally conveyed on roller tracks inside the loading bay, said roller tracks comprising fixing rails, said fixing rails being attached to a loading deck of an aircraft. In addition, power drive units (generally called PDUs) are used for conveying and are mostly individually attached to the loading deck. In addition, locking bar elements, either directly fixed to the loading deck or as part of these said fixing rails, are used to attach the containers and pallets. Such a customary arrangement is for example known from DE 29 08 400 A1.

The general problem with such arrangements comprises several aspects. In the first place, the whole arrangement must possess a high degree of stability, for the failure of just a few elements or loading devices can lead to a risk situation—e.g. if locking bar elements fail—or to considerable interruptions during loading or unloading—if power drive units or rollers break down—which in turn involves expensive time delays. Nevertheless, all elements must be as light as possible for loading onto the aircraft to allow a high useful load weight. A further aspect to be considered is that the requirements to be met often vary from plane to plane, e.g. concerning the arrangement of locking bar elements. Devices already in place often have to be modified, in order to convert a plane in a suitable manner, even, as the case may be, for a single trip.

The known arrangement is thus not yet perfect in all these respects.

SUMMARY OF THE INVENTION

The object of the invention is to demonstrate an arrangement, by means of which both high stability and flexible usability are guaranteed while keeping weight low.

This object is achieved by a fixing rail according to claim 1. The object is particularly achieved by a fixing rail for attaching loading devices, particularly rollers, locking bars or power drive units, to a loading deck of an aircraft, comprising a first and a second rail, each rail having a cheek with first attachment devices, to which the loading devices can be fixed, and a first floor section, to which the cheek is attached by a lower edge, each first floor section having second attachment devices, by means of which the first floor section can be attached to the loading deck, the rails separated from each other being mountable on the loading devices in such a way that they are connected to each other by means of the loading devices and—optionally indirectly—the loading deck, following mounting and attachment to the loading deck.

A major point of the invention is therefore that the fixing rails are no longer—as was customary up till now—constructed from U-profiles with lateral walls and a floor. Nevertheless, the fixing rail according to the invention possesses a high degree of stability due to the fact that the two rails that replace the lateral walls of the U-profile, customary up till now, are themselves connected to each other by means of the loading devices and in addition the rails are attached to the loading deck by optionally inserting a mounting adaptor, thus producing an extremely stable box profile. Nevertheless, this is lighter than was customary up till now in such fixing rails.

The first attachment devices are preferably constructed in such a way that the cheeks can be mounted torsionally resistant against each other. In one embodiment of the invention, these first attachment devices comprise relatively large locating faces and bores, so that the loading devices can be attached to the rails with a large surface area in contact and can easily absorb any forces or torques that occur.

The cheeks comprise preferably various pairs of vertical walls, which are attached at differing intervals from each other to the floor sections in such a way, that loading devices of various widths can be assembled between them. Those vertical walls that are not required for stability or are in the way are removed. A basic system is thus offered, which is adaptable to all fitting requirements through simple material processing.

On the floor sections, particularly lying parallel opposite each other, top sections are preferably attached to the upper edges of the cheeks. This produces further rigidity in the profile, the edges of the top sections, projecting outwards after mounting, being preferably bent downwards in the direction of the floor sections. On the one hand, this reduces the risk of injury and, on the other hand, the profile is given more rigidity.

The rails are preferably constructed as a single piece, particularly fabricated as extruded profiles. This type of fabrication is particularly advantageous when several vertical walls are present. The top sections and the vertical walls are removed by machining in areas in which loading devices are assembled, so that there is sufficient space for the loading devices. In areas where material is "superfluous" to stability, the superfluous material is removed.

The vertical walls are provided with recesses in places where access from the side is necessary, e.g. to attach loading devices. Furthermore, such areas, in which no loads operate, can likewise be provided with recesses.

All recesses are preferably constructed in such a way that the rails in their sections above the floor sections follow the outer contours of the attached loading devices in their construction. A maximum weight saving with unchanged stability is thus achieved.

In addition, the floor sections are of wider dimensions where the floor is attached to the loading deck. In order to save weight, the remaining areas can have a narrower construction.

In a preferred embodiment of the invention, the attachment devices comprise mounting blocks, which, on the one hand, have attachment devices to connect to the rails and, on the other hand, have attachment devices, which can be connected to attachment devices provided on the loading deck. These attachment devices provided on the loading deck are for example "seat rails", in which appropriate clamps can be attached, which can engage with the afore-mentioned attachment devices by means of snap closures.

The vertical walls are provided with bores, preferably at regular intervals, for the optional mounting of loading devices. Such an arrangement of bores to receive the conveyor rollers is particularly useful, so as to ensure continuously constant intervals between the individual conveyor rollers, even when a locking bar element is removed from its designated place.

A further, important fundamental idea of the invention is that the rails form a frame for movable parts of a loading device, particularly of a power drive unit or locking bar, in such a way that rotational axes of the loading devices can be mounted directly in the rails. Thus, for example, a power drive unit that usually has a frame, in which an upwardly-pivotable housing is mounted with the drive rollers, can be assembled directly in the fixing rail without these frames, in other words, without the frame. This does not only save space, more importantly, it saves considerable weight. The same naturally applies to locking bar elements as well, strengthening plates being mountable on the rails as an optional extra.

BRIEF DESCRIPTION OF THE DRAWINGS

In the following, preferred embodiments of the invention will be described in more detail by means of drawings, in which.

DETAILED DESCRIPTION

Figure 1:
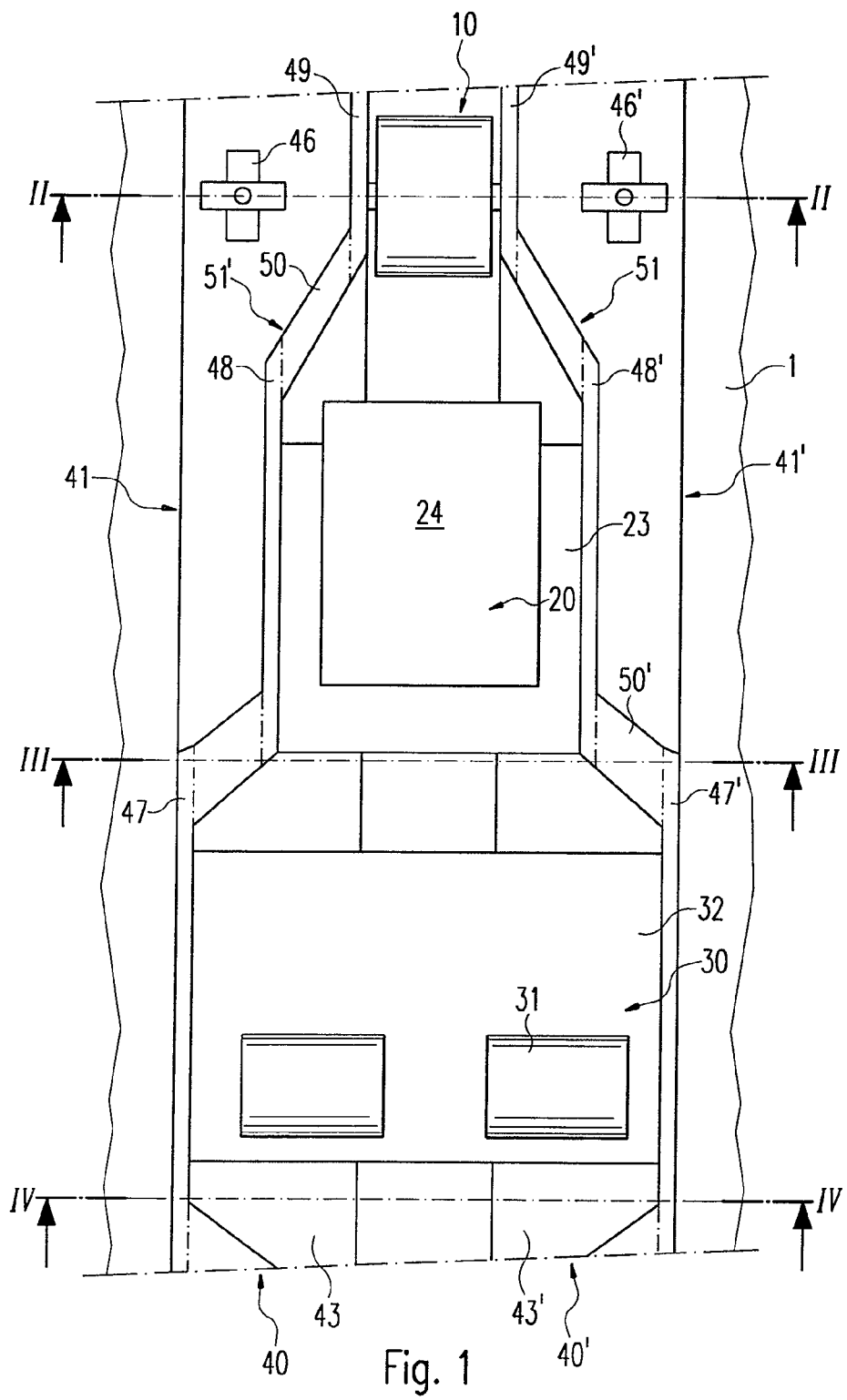
FIG. 1 shows a top view of a section of a fixing rail with loading devices assembled therein.
Figure 2:
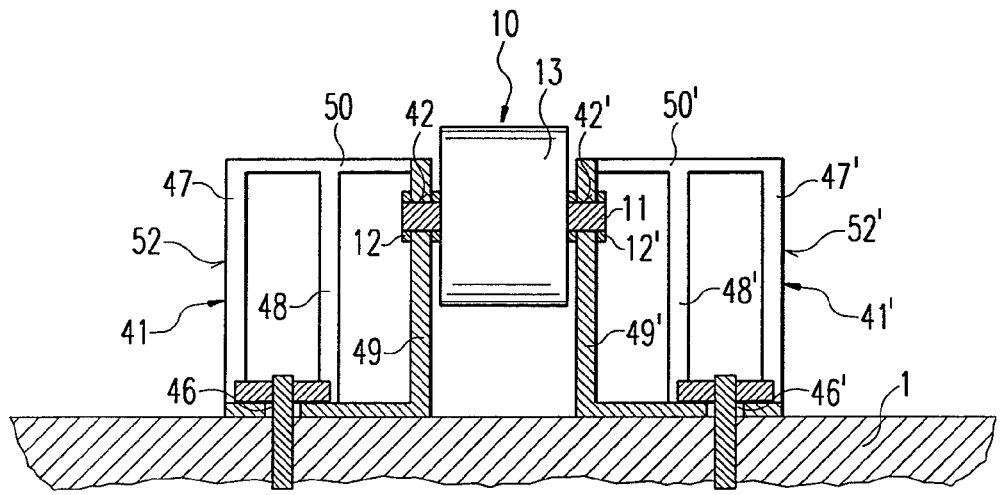
FIG. 2 shows a cross-section along line II-II from FIG. 1.
Figure 3:
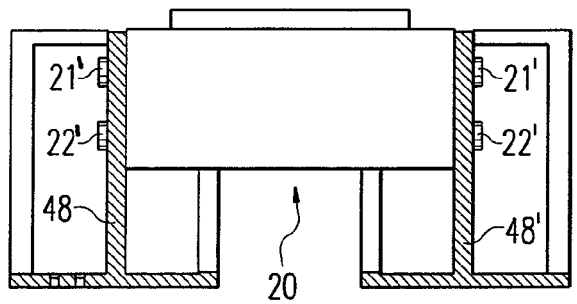
FIG. 3 shows a cross-section along line from FIG. 1.
Figure 4:
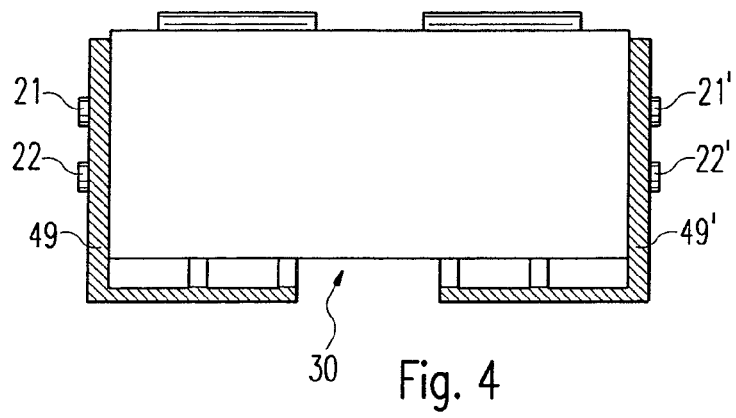
FIG. 4 shows a cross-section along line IV-IV from FIG. 1.

In the following description, the same reference numerals are used for identical and identically functioning parts.

In the embodiment of the invention shown in FIGS. 1-4, a fixing rail is mounted on a loading deck 1, said fixing rail comprising a first rail 40 and a second rail 40'. The rails 40, 40' each have cheeks 41, 41', in which attachment devices or bores 42, 42' are located. In the exemplary embodiment shown here, a roller 10, a locking bar 20 and a power drive unit 30 are attached in the bores. The roller 10 is attached to its shaft 11 with nuts 12, 12' at each end in such a way that its roller body 13 can rotate. The shaft 11 has a shoulder, so that a rigid and also torsionally resistant connection between the cheeks 41, 41' occurs when tightening the nuts 12, 12'.

The locking bar 20 is attached with its frame 23 by means of fastening bolts 21, 21' and 22, 22' to the cheeks 41, 41' and has a claw 24, which can lock containers or pallets. The power drive unit 30 is also attached by means of fastening bolts 21, 21', 22, 22' to the cheeks 41, 41' and comprises drive rollers 31.

In the embodiment shown here, the cheeks 41, 41' of the rails 40, 40' are each constructed as a single piece of extruded profile and each has a floor section 43, 43', outer vertical walls 47, 47', central vertical walls 48, 48' and inner vertical walls 49, 49'. The vertical walls 47-47' are connected together by top sections 50, 50' at their upper faces.

The rails 40, 40' are rigidly mounted on the loading deck 1 by means of second attachment devices 46, 46'. This arrangement thus forms a box profile, which, firstly, comprises the rails 40, 40', secondly, the connections of the rails 40, 40' by means of the rollers 10, locking bars 20 and power drive units 30 and, thirdly, the connection by means of the loading deck 1.

The rollers 10, locking bars 20 and power drive units 30 have different widths. In the embodiment shown here, the rollers 10 are the narrowest parts of the loading devices and are attached to the inner vertical walls 49, 49' in the bores 42, 42' provided for that purpose.

The locking bars 20 have a medium width and are attached to the central vertical walls 48, 48'. The inner vertical walls 49, 49' are milled in order to make room for this. The area of the central vertical wall 48, 48' and the inner vertical wall 49, 49', where a power drive unit 30 is assembled, is likewise removed by milling. Those areas of the top sections 50, 50' are also removed by milling, where they would interfere with the fitting of the power drive unit 30.

Finally, parts of the top sections 50, 50' and the outer vertical wall 47, 47' and the central vertical wall 48, 48' are removed by milling, where access from above for the second attachment devices 46, 46' is necessary, by means of which the rails 40, 40' are attached to the loading deck 1.

The embodiment shown in FIGS. 5-8 differs from that in FIGS. 1-4, in that the rails 40, 40' are not screwed directly onto the loading deck 1, but by means of a mounting block 53. In this respect, the rails 40, 40' are rigidly screwed on the mounting block 53 by means of threaded bolts 46, 46', which serve as second attachment devices. The mounting block 53 is in turn attached to the loading deck 1 by means of attachment devices 2, 2', the attachment devices 2, 2' being attached to the loading deck 1 in the standard manner. In this embodiment of the invention, therefore, the rails 40, 40' are mounted by first being connected to each other by means of a plurality of mounting blocks 53, it being possible for this mounting to take place outside the loading bay.

Figure 5:
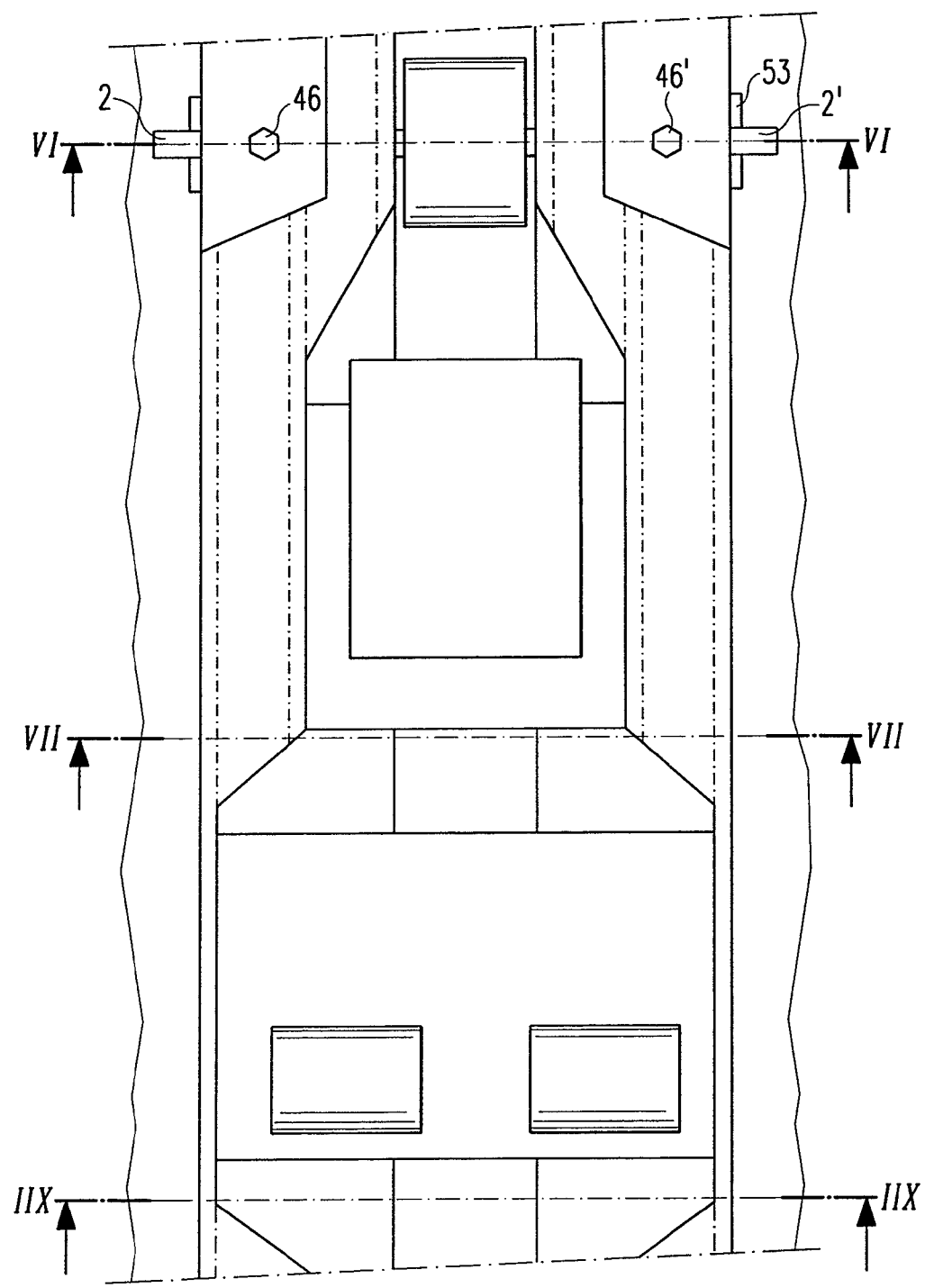
FIG. 5 shows a view similar to FIG. 1, however, of a further embodiment of the invention.
Figure 6:
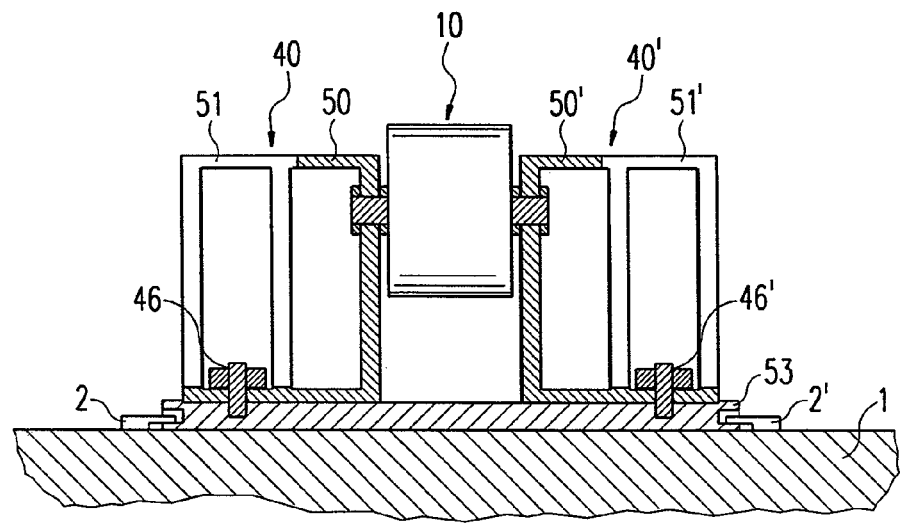
FIG. 6 shows a cross-section along line VI-VI of FIG. 5.
Figure 7:
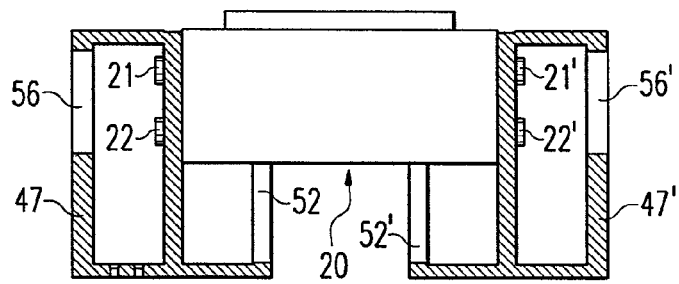
FIG. 7 shows a cross-section along line VII-VII of FIG. 5.
Figure 8:
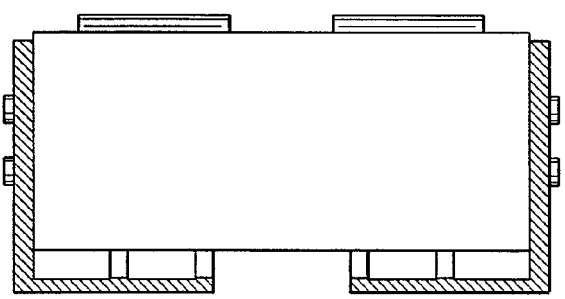
FIG. 8 shows a cross-section along line VIII-VIII of FIG. 5.

Furthermore, the embodiment according to FIGS. 5-8 differs from that of FIGS. 1-4, in that, to increase stability of the rails 40, 40', only parts of the top sections 50, 50' and vertical walls 47-49' were removed, as appears particularly from FIGS. 5-7. For example, according to FIG. 7, only access apertures 56, 56' are provided in the outer vertical walls 47, 47' to enable a locking bar 20 to be attached by means of its attachment screws 21, 22, 21', 22'.

Figure 9:
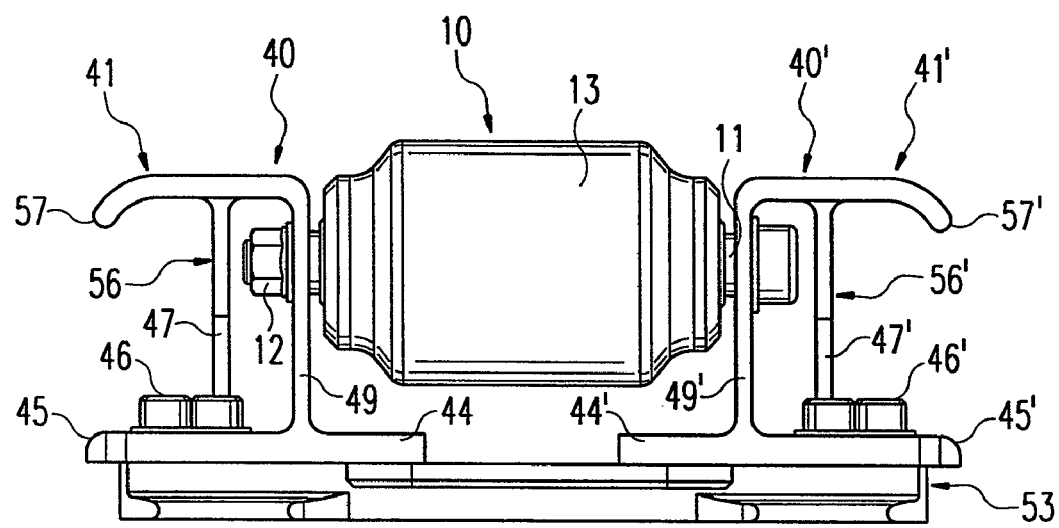
FIG. 9 shows front view of a fixing rail with a roller assembled therein according to a further embodiment of the invention.
Figure 10:
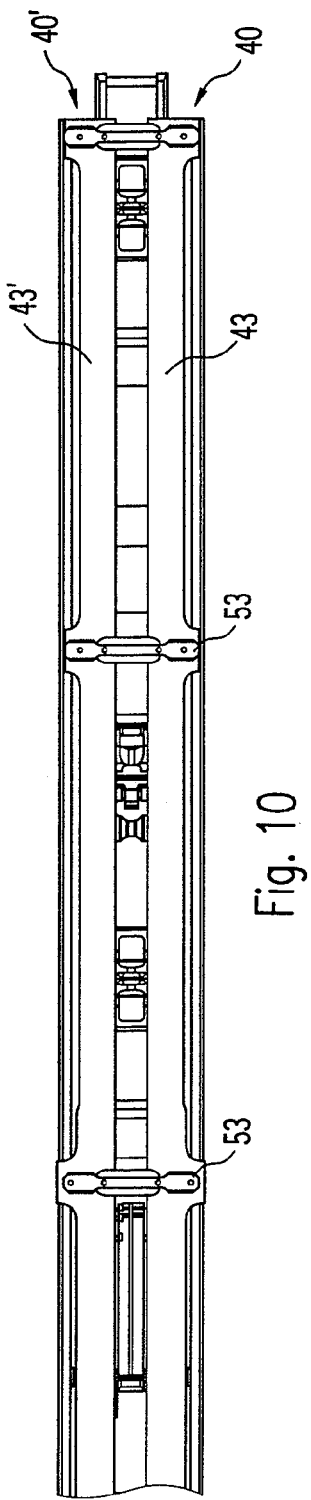
FIG. 10 shows a view from below of the rail according to FIG. 1.
Figure 11:
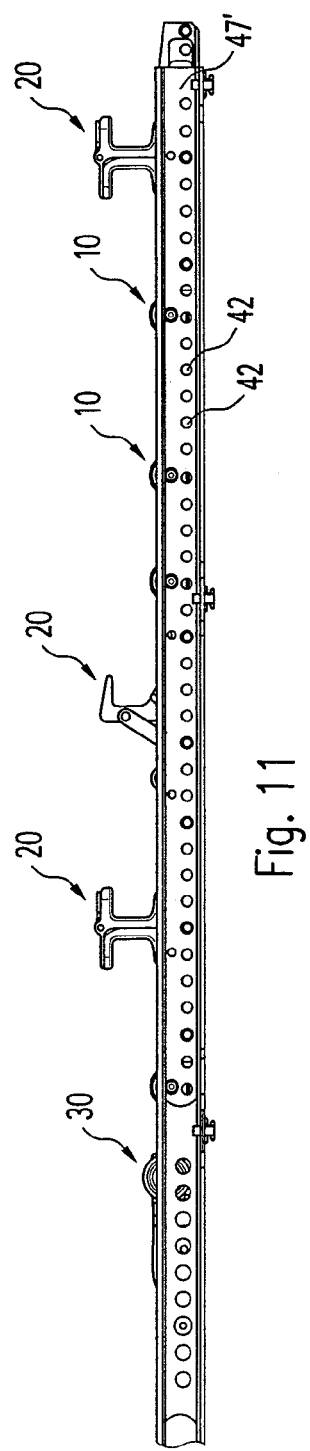
FIG. 11 shows a lateral view of the rail according to FIG. 9 with further loading devices assembled therein.
Figure 12:
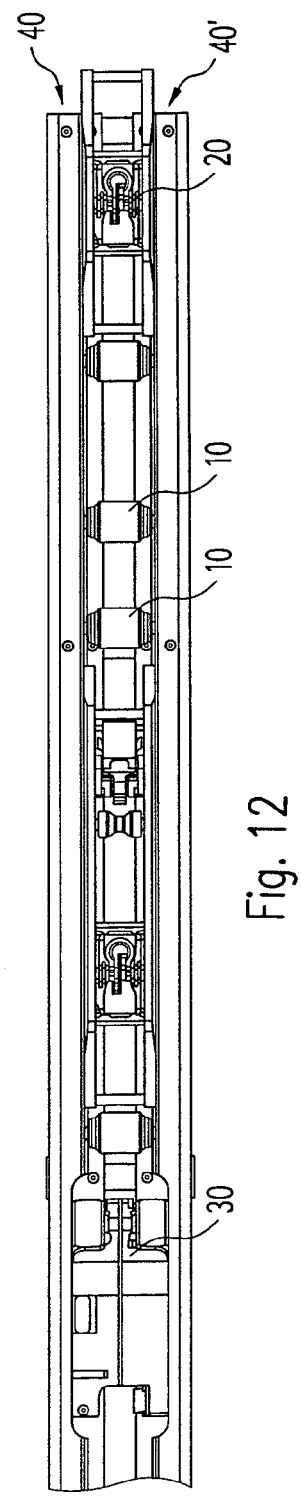
FIG. 12 shows a top view of the rail according to FIG. 10 or 11.

The embodiment of the invention shown in FIG. 9 basically represents a continuation of the embodiment of the invention illustrated in FIGS. 5-8. What is important here is the fact that the outer edges 57, 57' of the rails 40, 40' are bent downwards and rounded off, so that, on the one hand, there is a reduced risk of injury to operating staff on the loading deck and, on the other hand, there is a considerable increase in torsional rigidity and flexural strength in the rails 40, 40'.

The embodiment according to FIG. 9 is illustrated in more detail in FIGS. 10-15.

FIG. 9 shows how the rails 40, 40' with their floor sections 43, 43' are connected to each other by means of the mounting blocks 53. Furthermore, it can be seen from the representation in FIG. 10, that the floor sections 43, 43' comprise recesses at their outer edges, thus reducing weight. In the lateral view in FIG. 11 or in the top view in FIG. 12, the rollers 10, locking bars 20 and power drive units 30 are easily recognizable, as well as the fact that a plurality of bores 42, 42' is provided, so that plurality of rollers 10 can be installed in positions where they are required, in order to convey the freight correctly.

To increase the tipping stability of the rails 40, 41, the floor sections 43, 43'—as shown particularly in FIG. 9—are subdivided into outer legs 45, 45' and inner legs 44, 44', only two vertical walls, namely an outer vertical wall 47, 47' and an inner vertical wall 49, 49', being provided and these vertical walls 47-49' being arranged roughly symmetrically within the floor sections 43, 43'.

Figure 13:
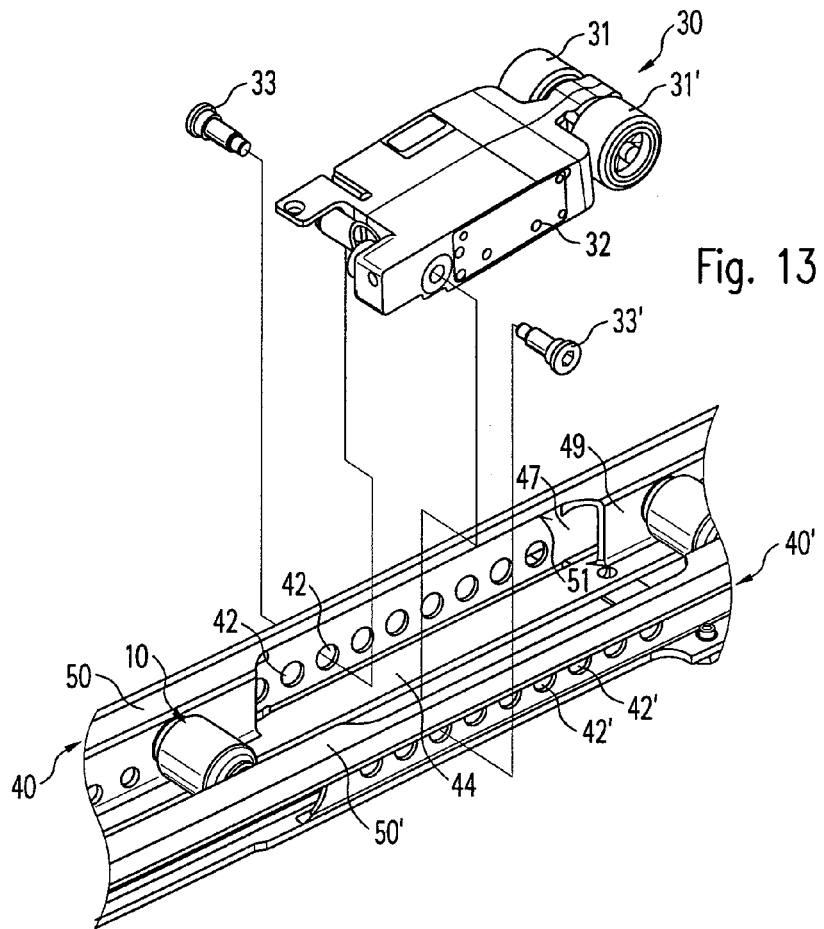
FIG. 13 shows an exploded view of a section of the fixing rail according to FIGS. 10-12.
Figure 14:
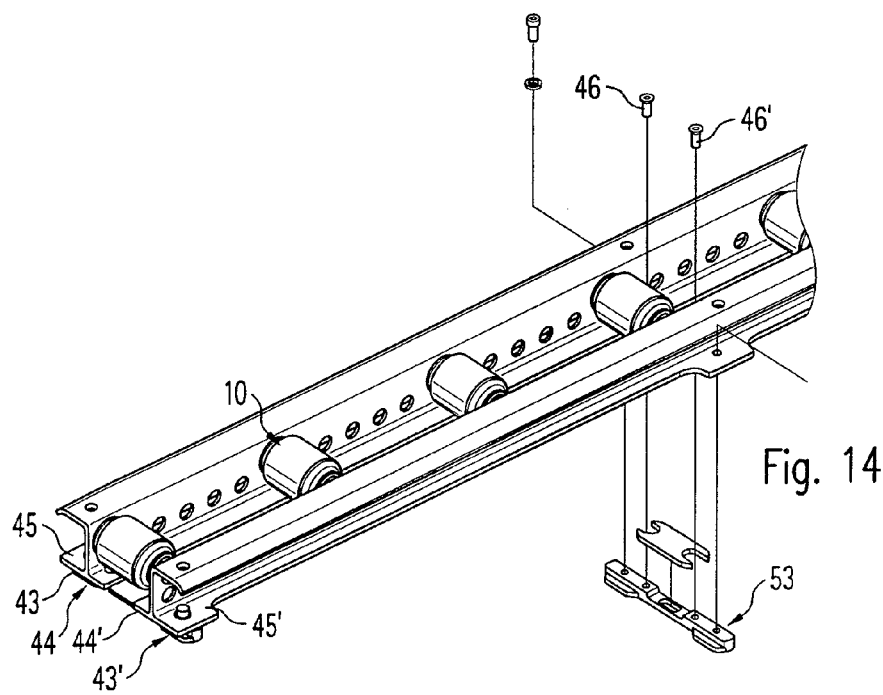
FIG. 14 shows an exploded view of an end section of the rail according to FIGS. 10-12 and FIG. 15 shows an exploded view of a further section of the fixing rail according to FIGS. 10-12.

Furthermore, it appears from FIG. 13 that the power drive unit 30 does not have its own frame, rather it is bedded by means of bearing bolts 43, 43' directly in the rails 40, 40' and it can oscillate up and down. An appropriate cam device is used in a known manner to raise the power drive unit 30, said cam device (likewise directly) supporting itself on the floor sections 43, 43' and their inner legs 44, 44'.

Figure 15:
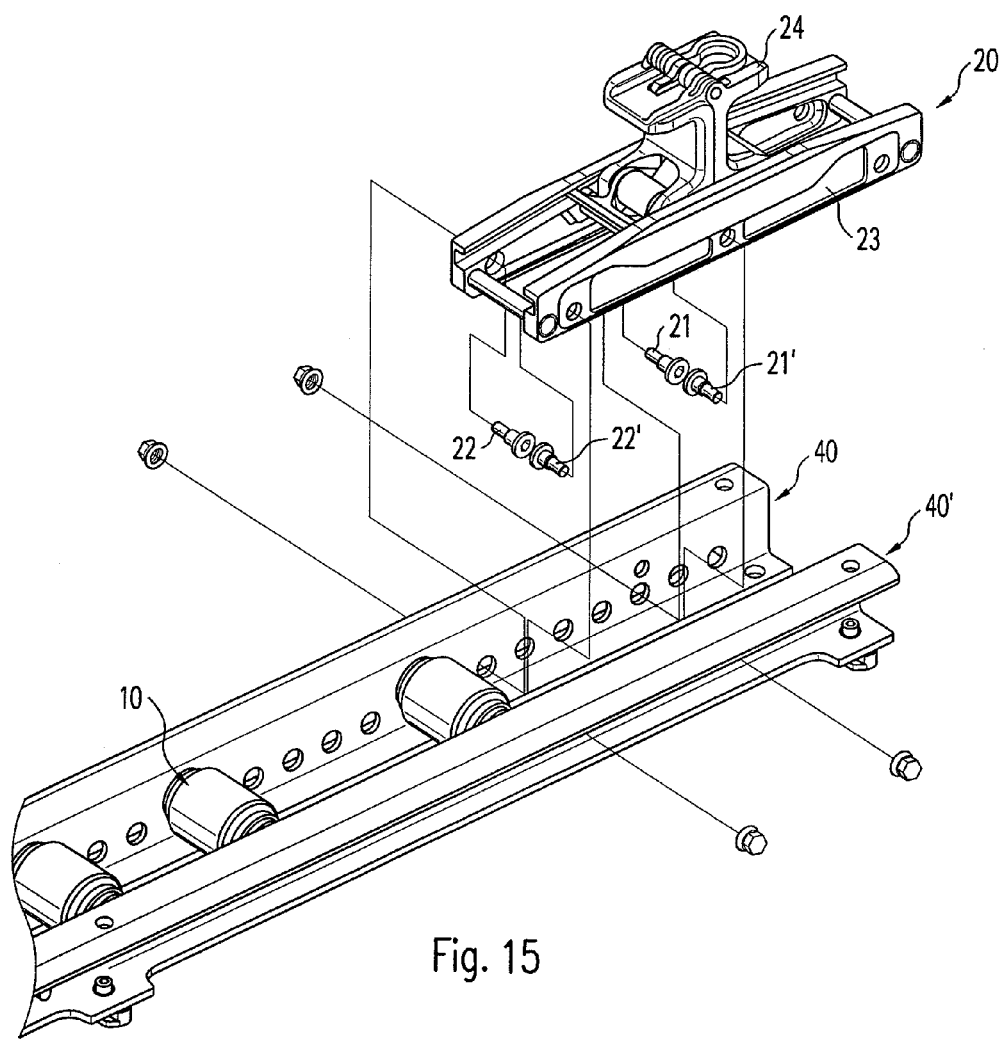

The attaching of a locking bar is drawn in more detail in FIG. 15. It should be noted in this respect that, for such a locking bar 20, the frame 23 can also be formed from the inner lateral walls within the rails 40, 40'.

REFERENCE NUMERALS
1 loading deck
2, 2' attachment device
10 roller
11 shaft
12, 12' nut
13 roller body
20 locking bar
21, 21' fastening bolt
22, 22' fastening bolt
23 frame
24 claw
30 power drive unit
31 roller
32 pivot frame
33, 33' bearing bolt
40, 40' rail
41, 41' cheek
42, 42' first attachment device/bore
43, 43' floor section
44, 44' inner leg
45, 45' outer leg
46, 46' second attachment device
47, 47' outer vertical wall
48, 48' central vertical wall
49, 49' inner vertical wall
50, 50' top section
51, 51' top section recess
52, 52' vertical wall recess
53 vertical block
56, 56' access aperture
57, 57' outer edge

What is claimed is:

1. A fixing rail system, comprising:
a first and a second rail, configured to attach at least one loading device in the following list: rollers or power drive units, on a loading deck of an aircraft, each rail comprising a cheek with first attachment devices for fixing the loading devices to the rail, and a floor section to which the cheek is attached by a lower edge of the cheek, each floor section comprising second attachment devices for attaching the floor section to the loading deck, the rails with their cheeks separated from each other being mountable to the loading devices in such a way that the rails are connected to each other by means of the loading devices and the loading deck, following mounting and attaching of the rails to the loading deck.

2. The fixing rail system according to claim 1, wherein the first attachment devices are constructed in such a way, that the cheeks can be mounted torsionally resistant against each other.

3. The fixing rail system according to claim 1, wherein on the floor sections, top sections, lying parallel opposite, are attached to the upper edges of the cheeks.

4. The fixing rail system according to claim 3, wherein the top sections comprise recesses.

5. The fixing rail system according to claim 4, wherein the recesses are constructed in such a way that the rails in their sections above the floor sections follow the external contours of the attached loading devices in their construction.

6. The fixing rail system according to claim 1, wherein the rails are constructed as a single piece.

7. The fixing rail system according to claim 1, wherein the second attachment devices comprise mounting blocks, which, comprise attachment devices to connect to the first and second rail and, comprise attachment devices, which can be connected to attachment devices provided on the loading deck.

8. The fixing rail system according to claim 1, wherein the cheeks comprise pairs of vertical walls which are attached at different intervals to the floor sections and the vertical walls provided with bores.

9. The fixing rail system according to claim 1, wherein the first and second rail are constructed in such a way that the rails form a frame for movable parts of a loading device, in such a way that rotational axes of the loading devices can be mounted directly between the rails.

10. A fixing rail for attaching loading devices comprising:
a first and a second rail, configured to attach at least one loading device in the following list: rollers or power drive units, on a loading deck of an aircraft, each rail comprising a cheek with first attachment devices for fixing the loading devices to the rail, and a floor section to which the cheek is attached by a lower edge of the cheek, each floor section comprising second attachment devices for attaching the floor section to the loading deck, the rails with their cheeks separated from each other being mountable to the loading devices in such a way that the rails are connected to each other by means of the loading devices and the loading deck, following mounting and attaching of the rails to the loading deck, wherein each cheek comprises various pairs of vertical walls which are attached at different intervals to the floor sections for mounting loading devices of various widths between the walls.

11. The fixing rail system according to claim 10, wherein the vertical walls comprise recesses.

12. The fixing rail system according to claim 11, wherein the recesses are constructed in such a way that the rails in their sections above the floor sections follow the external contours of the attached loading devices in their construction.

13. The fixing rail according to claim 10, wherein the first attachment devices are constructed in such a way, that the cheeks can be mounted torsionally resistant against each other.

14. The fixing rail according to claim 10, wherein on the floor sections, top sections, lying parallel opposite, are attached to the upper edges of the cheeks.

15. The fixing rail according to claim 10, wherein the rails are constructed as a single piece, fabricated as extruded profiles.

16. The fixing rail according to claim 10, wherein the vertical walls comprise recesses.

17. The fixing rail according to claim 10, wherein the second attachment devices comprise mounting blocks, which, comprise attachment devices to connect to the first and second rail and, comprise attachment devices, which can be connected to attachment devices provided on the loading deck.

18. The fixing rail according to claim 10, wherein the vertical walls are provided with bores, for the optional mounting of loading devices.

19. The fixing rail according to claim 10, wherein the first and second rail are constructed in such a way that the rails form a frame for movable parts of a loading device, a power drive unit or a locking bar in such a way that rotational axes of the loading devices can be mounted directly between the rails.

* * * * *